April 3, 1951 A. S. HAMILTON, JR 2,547,460
LOADING RAMP
Filed March 8, 1950 3 Sheets-Sheet 1
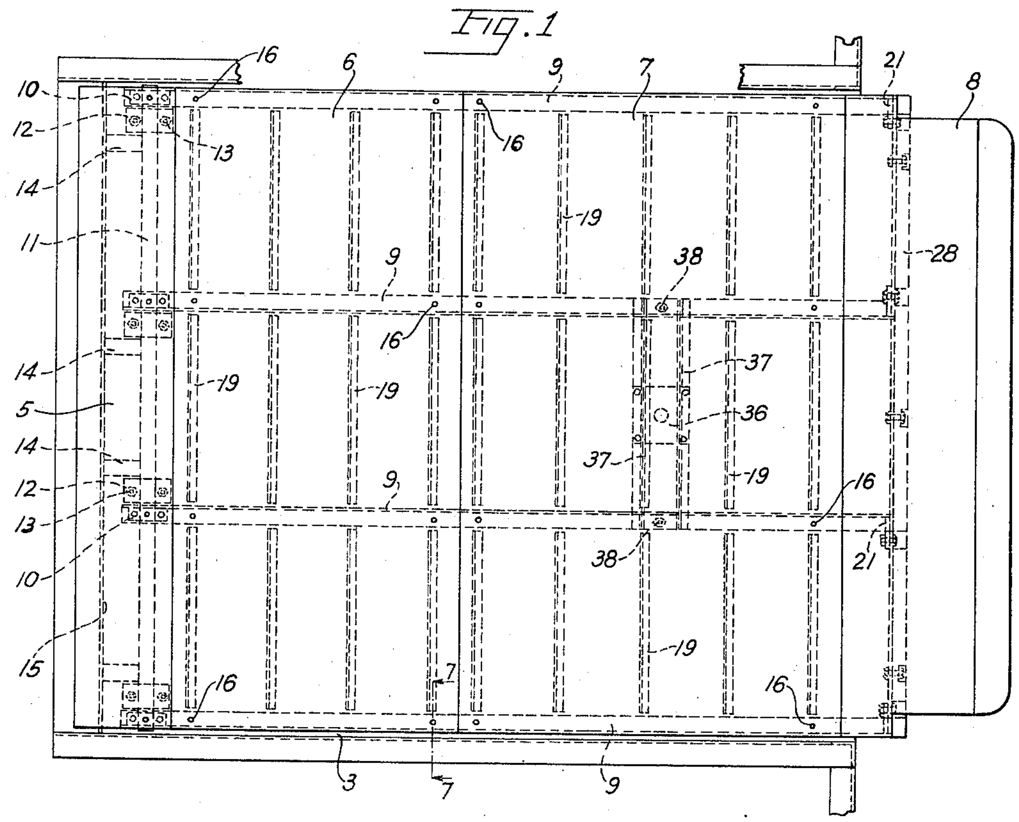
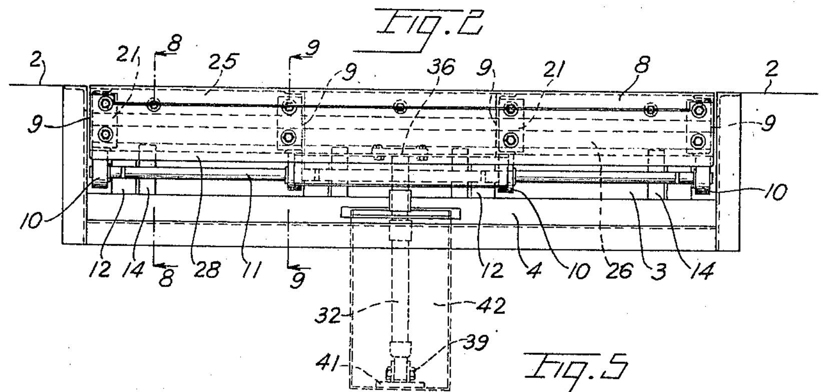
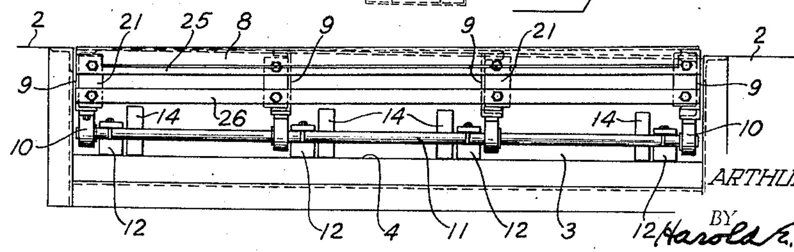
INVENTOR
ARTHUR S. HAMILTON, JR.
BY Harold E. Stonebraker
ATTORNEY April 3, 1951 A. S. HAMILTON, JR 2,547,460
LOADING RAMP
Filed March 8, 1950 3 Sheets-Sheet 2
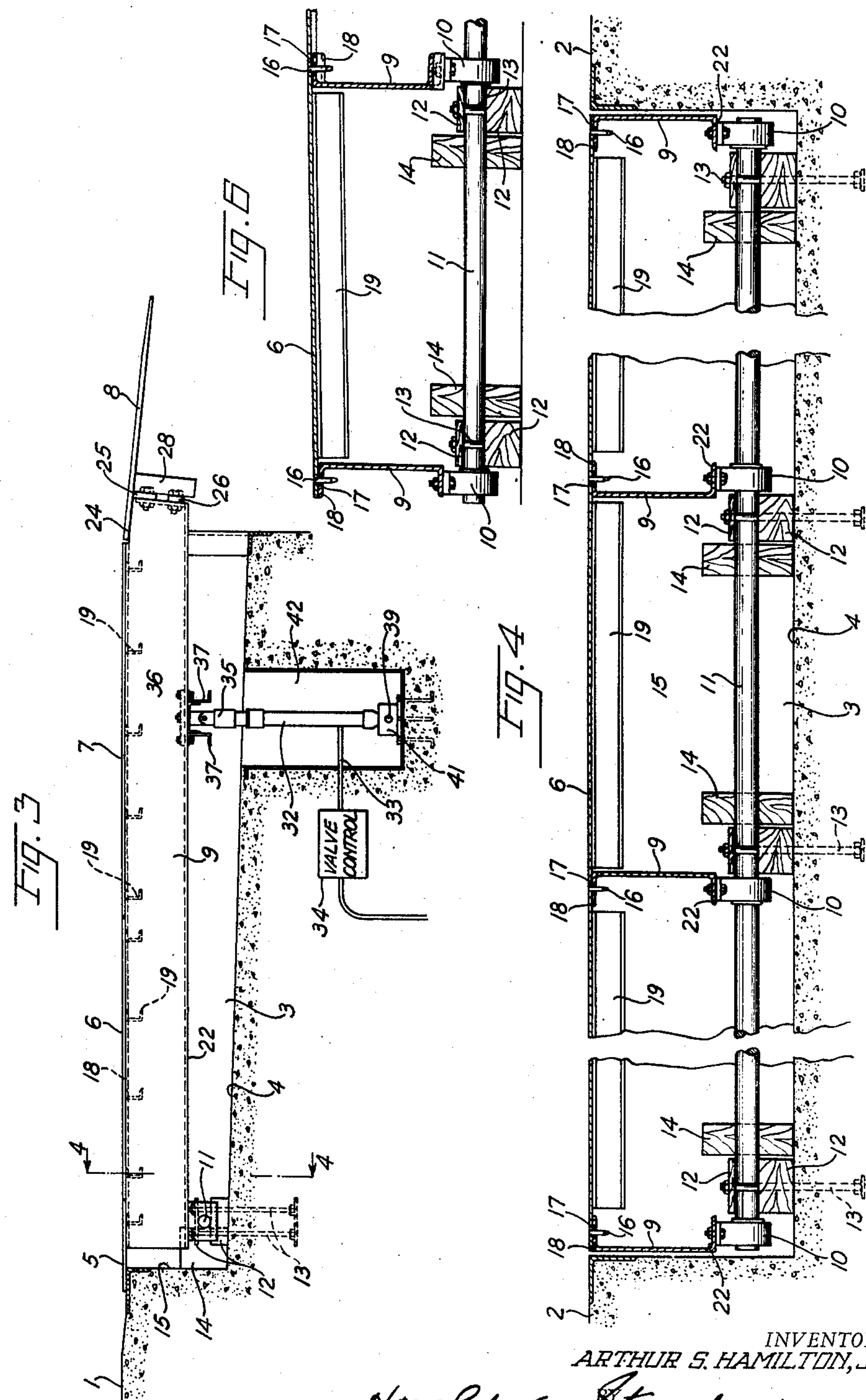
INVENTOR
ARTHUR S. HAMILTON, JR.
Harold E. Stonebraker,
ATTORNEY April 3, 1951 A. S. HAMILTON, JR 2,547,460
LOADING RAMP
Filed March 8, 1950 3 Sheets-Sheet 3
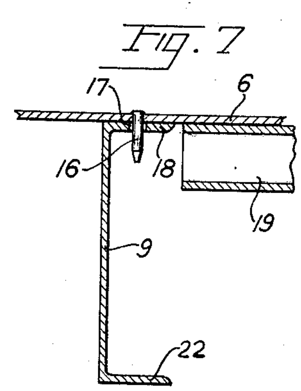
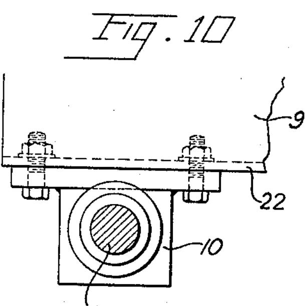
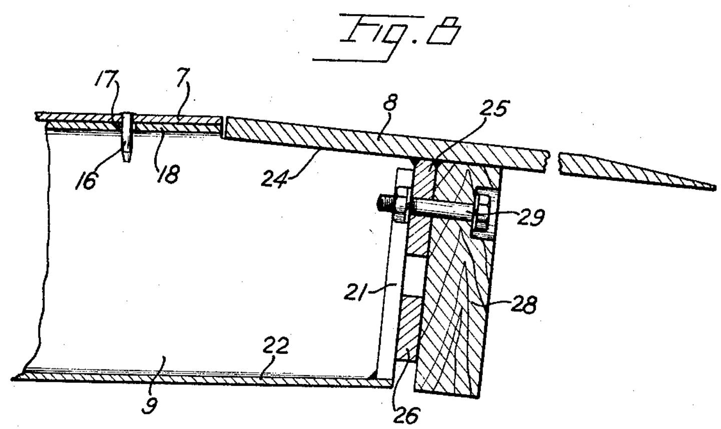
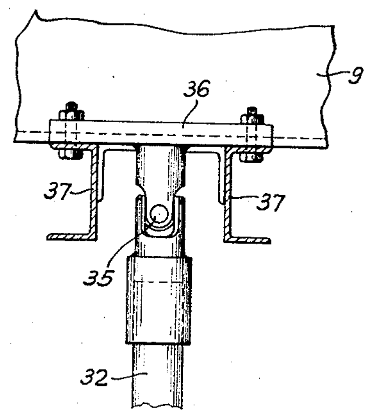
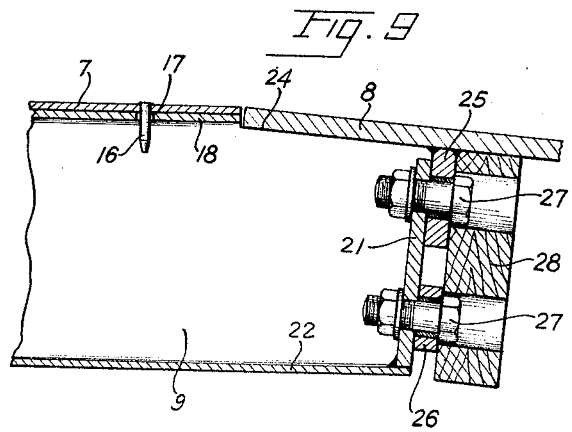
INVENTOR
ARTHUR S. HAMILTON, JR.
BY Harold E. Stonebraker
ATTORNEY Patented Apr. 3, 1951

2,547,460

UNITED STATES PATENT OFFICE 2,547,460

LOADING RAMP

Arthur S. Hamilton, Jr., Brighton, N. Y.

Application March 8, 1950, Serial No. 148,374

9 Claims. (Cl. 14—71)

This invention relates to a loading ramp, more particularly of the type that provides a floor plate connecting a loading dock with the floor or tail gate of a transport truck or trailer to enable operating a power or hand truck from the loading dock onto the floor of the transport truck for loading or unloading mechandise, and it has for its purpose to afford a practical and efficient structure which can be readily controlled and renders the floor plate of the ramp self-adjustable to any angle of inclination of the floor of the transport truck.

In the usual operation of loading a transport truck from a loading dock, the forward portion of the ramp is elevated so that the front edge of its floor plate is above the level of the floor of the transport truck which is then backed against the loading dock. Thereupon the ramp is permitted to lower until the front edge of the floor plate rests on the floor of the transport truck. If, however, the ground on which the transport truck is resting is not level or the springs or tires of the truck are lower on one side than on the other, the floor of the truck is inclined laterally and consequently the floor plate of the loading ramp if it moves downwardly to the same extent throughout its entire width will be in engagement with the truck floor at one point and above the truck floor at another point so that a wide gap exists between one portion of the floor plate of the ramp and the truck floor which is likely to upset a hand truck and spill merchandise or make it difficult to move a hand truck from the loading dock onto the transport truck floor or in the opposite direction, and it is a particular purpose of this invention to afford a loading ramp so contructed that the forward edge of the floor plate of the ramp or the forward extension plate or lip which rests on the floor of the transport truck adjusts itself automatically to the angle of inclination of the truck floor on which it rests and lies in close contact with the truck floor throughout the width of the ramp irrespective of the angle at which the truck floor may be disposed.

It is important that the floor plate of a loading ramp be flush at its rear end with the loading dock in order that loading trucks may readily move from the dock onto the ramp, and if a floor plate consists of a single sheet of metal alined at its rear end with the dock surface and heavy enough to support a loading truck without bending, the floor plate will not adjust itself at its front edge to the floor of a transport truck when the latter is inclined to a horizontal plane, and if the floor plate is of sufficiently thin metal to permit its front edge to adjust itself to a horizontally inclined floor of a transport truck, it will not be sufficiently strong or stiff to support a loading truck without bending, and it is a purpose of the invention to afford a construction in which a floor plate can be made sufficiently heavy and stiff to support loading trucks and sufficiently flexible to conform at its rear end to the surface of a loading dock while its front end adjusts itself to any angle of inclination of the transport truck floor or tail gate and the body of the floor plate can warp to compensate for the different angles of elevation of the supporting bars.

Specifically the purpose of the invention is to afford a ramp in which the forward portion of the floor of the ramp or the forwardmost plate extension follows closely any up or down movement of the truck floor, one side of the plate extension being permitted to occupy a position several inches lower than the other side so that there is never a drop or break between any portion of the forward edge of the ramp floor plate and the floor of the transport truck which might cause upsetting of a hand truck or injury to the operator.

An additional object of the invention is to afford a construction in which a floor plate rests on and is pivotally or interlockingly but loosely connected to a multiplicity of supporting bars that are movable independently in parallel spaced vertical planes, so that the floor plate which extends across the supporting bars may occupy a position inclined in two directions to a horizontal plane and conforming to any inclined position of the transport truck floor, while the supporting bars on which the floor plate is mounted can occupy corresponding positions at different elevations and thus provide proper and adequate support for the floor plate regardless of the inclination at which it may be located.

A further purpose of the invention is to afford a practical and efficient arrangement in which a plurality of supporting bars may be pivotally arranged at their rear ends for independent vertical swinging movement and a plurality of floor plates can be arranged on the supporting bars extending thereacross and in juxtarelationship endwise, each floor plate having a loose interlocking or pivotal connection with the supporting bars to permit the necessary vertical movement of the supporting bars and the relative lateral movement of each floor plate as the latter occupies a warped and inclined position in contact with the inclined truck floor and above the differently elevated supporting bars.

An additional object of the invention is to afford a structure in which the floor plates are adequately strengthened and braced and the supporting bars are mounted and connected in such manner as to insure their accurate movement in parallel planes while at the same time affording practical and efficient means for supporting at the forward edge of the ramp an extension plate which is preferably separate from and inclined slightly downwardly from the front edge of the forwardmost floor plate to facilitate movement of a hand truck from a loading dock onto the floor of a transport truck.

In a more particular aspect, the invention has for its purpose to provide a construction in which the floor of the ramp is made up of separate floor plates, each extending for a portion of the length of the ramp, the several floor plates being arranged in juxtarelation to each other endwise and extending across independently movable supporting bars that swing in vertical planes, and each floor plate being loosely interlocked with and movable laterally of the supporting bars so that the forward edge of the forwardmost floor plate adjusts itself automatically to the floor of a transport truck when disposed at an angle to a horizontal plane while the rear edge of the rearmost floor plate is alined with the dock surface, and the intermediate floor plates are correspondingly warped and arranged on the supporting bars so that there is a continuous and unbroken floor or truck-supporting surface from the dock surface to the floor of the transport truck.

To these and other ends, the invention consists in the construction and arrangement of parts that will appear clearly from the following description when read in conjunction with the accompanying drawings, the novel features being pointed out in the claims following the specification.

In the drawings:

Fig. 1 is a plan view of a loading ramp constructed in accordance with a preferred embodiment of the invention;

Fig. 2 is a front elevation of the same showing the ramp and floor plates in normal position flush with the top surface of the loading dock;

Fig. 3 is a view in side elevation of the structure appearing in Fig. 1;

Fig. 4 is a transverse vertical sectional view on line 4—4 of Fig. 3 looking in the direction indicated;

Fig. 5 is a front elevation similar to Fig. 2 with parts omitted, and showing the floor plates in the position which they occupy when inclined in two directions to a horizontal plane and warped to aline the extension plate with an inclined floor of a transport truck, the supporting bars being correspondingly positioned at different elevations;

Fig. 6 is an enlarged transverse vertical sectional view of the central supporting bars and central portion of a floor plate resting thereon, looking from the front end toward the back end of the ramp and illustrating the position of two supporting bars when the floor plate is in a position inclined in two directions to a horizontal plane as in Fig. 5;

Fig. 7 is an enlarged detail sectional view taken on line 7—7 of Fig. 1;

Fig. 8 is an enlarged detail sectional view taken on line 8—8 of Fig. 2;

Fig. 9 is an enlarged detail sectional view taken on line 9—9 of Fig. 2;

Fig. 10 is an enlarged detail sectional view showing the connection between the fixed shaft on which the supporting bars are mounted and the bearing for one of the pivoted supporting bars, and Fig. 11 is an enlarged detail sectional view showing the connection between the supporting bars and the elevating means.

Referring more particularly to the drawings in which like reference numerals refer to the same parts through the several views, 1 designates the top surface of the loading dock at the rear of the ramp while 2 designates the top surfaces of the loading dock at the sides of the ramp, see Figs. 3 and 4, 3 is the pit within which the ramp is housed, and 4 designates the bottom of the pit upon which the supporting members are mounted, as will be described presently.

The top or floor of the ramp comprises a plurality of rectangular floor plates which are independently supported in juxtarelation to each other and movable relatively to their supporting bars, and in the arrangement shown, there is provided a rear floor plate 5 which extends over the loading dock and a short distance forwardly over the supporting bars, an intermediate floor plate 6 with its rear edge in juxtarelation to the floor plate 5, and a forward floor plate 7 with its rear edge in juxtarelation to the floor plate 6. In advance of the floor plate 7 and in juxtarelation thereto is an extension plate 8 which is preferably inclined downwardly from the forward floor plate 7 and is adapted to engage and adjust itself to the floor or tail gate of a transport truck, while the rear floor plate 5 occupies a position substantially flush with the rear dock surface 1. The several floor plates and extension plate preferably extend entirely across the supporting bars of the ramp, to be described presently, and rest on the supporting members, although it is to be understood that there may be a greater or less number of floor plates as requirements demand.

Each floor plate is preferably of steel from $\frac{3}{16}''$ to ¼" thick, and extends across a plurality of supporting bars to which it is connected in such manner as to permit the floor plate to warp and move slightly laterally of the supporting bars while the latter can swing in spaced parallel vertical planes, and to accomplish this objective, there are provided a series of supporting channel bars 9, see Figs. 3 and 4, each of which has fastened thereto at its rear end a bearing or pillow block 10 that is rotatably mounted on a stationary shaft 11. The shaft 11 is fixedly held in clamping blocks 12 by means of bolts 13 suitably anchored in the concrete base while 14 designate limit blocks positioned with their front edges in contact with the shaft 11 and their rear edges abutting the rear wall 15 of the pit, and acting to hold the shaft 11 in true alinement and to prevent bending or distortion of the shaft 11 in case of endwise pressure exerted against the front ends of the supporting bars 9 when a transport truck is backed against the latter.

With this arrangement, each supporting channel bar 9 is movable on the fixed shaft 11 by swinging about the latter in a vertical plane, the several supporting bars 9 being spaced and arranged preferably as shown in Fig. 4, and the supporting bars 9 which are secured to the pillow blocks 10 are so mounted on the shaft 11 as to insure movement of each supporting bar in a true vertical plane perpendicular to the axis of shaft 11 without likelihood of any sidewise or twisting motion. The supporting channel bars 9 constitute a rigid and firm support for the floor plates of the ramp, irrespective of the positions assumed by the floor plates, and in order to enable this objective, each floor plate extends entirely across the several supporting bars 9 and is connected thereto by pivotal connections or interlocking means that permit slight lateral play and warping between the floor plate and the supporting bars.

This is accomplished preferably by providing each floor plate with metal pins 16 rigidly fastened to the floor plate by welding or in any suitable fashion and extending downwardly therefrom, see Figs. 4 and 6, through openings 17 provided in the top walls 18 of the channel bars 9. The openings 17 are sufficienty larger than the pins 16 to permit a slight lateral movement and warping of the floor plate relatively to the channel bars 9 so as to permit the supporting bars 9 to occupy positions at different elevations while accommodating themselves to any horizontally inclined or warped position of the floor plates resting thereon, as shown in Figs. 5 and 6. It will be understood that the floor plates may be loosely or pivotally connected to the supporting bars in any suitable fashion to permit the supporting bars to assume positions at different elevations in parallel vertical planes when the floor plates are inclined or warped to aline with a horizontally inclined truck floor or tail gate. In order to stiffen and strengthen adequately the floor plates, they are preferably provided with spaced parallel channel bars or angle bars 19, see Figs. 4 and 6, which are welded or otherwise rigidly fastened at their edges to the undersurface of each floor plate and extend between adjacent channel bars 9 transversely of the floor section. These angle bars 19 are preferably about 8″ apart, about 2″ wide, and about $\frac{3}{16}$″ thick.

Such a loading ramp can be made in various sizes and they have been constructed successfully in three lengths of 5′, 8′ and 12′ respectively with floor plates having widths of 6′ or 6′ 6″ for the 8′ and 12′ ramps, and a width of 5′ or 6′ for the 5′ length ramps. Each floor plate extends across the entire width of the ramp resting on the several supporting channel bars 9, and lengthwise of the ramp a distance depending upon the number of floor plates that are desirable to be employed, depending upon the length of the ramp and the particular character of work to be done. There may be three floor plates with an extension plate at the front end as shown, or there may be a greater or less number of floor plates without departing from the essential purposes of the invention.

In order to connect the supporting bars 9 and equalize their vertical movements so as to insure positioning in parallel vertical planes at all elevations, they are connected at their forward ends by equalizing devices in the form of parallel bars pivotally connected to the supporting bars, and to accomplish this each channel bar 9 has welded or otherwise fastened thereto at its front end a web or plate 21, see Figs. 8 and 9, the plates 21 being preferably disposed at a slight angle to a plane perpendicular to the bottom wall 22 of the channel bar 9, as shown in Fig. 8, for a purpose that will appear presently. The bottom wall 22 of the channel bar extends beyond the top wall 18, see Fig. 8, which terminates at a point coincident with the front edge of the forwardmost floor plate 7, the central web and top wall of the channel bar being cut away on an incline, as shown at 24, for a purpose that will appear presently.

Pivotally mounted on the several supporting plates 21 at the forward ends of the supporting bars 9 are the transverse parallel equalizing bars 25 and 26, these being held in pivotal relationship to the plates 21 by means of the bolts 27, thus permitting the channel bars 9 to assume positions at different elevations, as shown in Fig. 5, and the channel bars are maintained always in parallel relationship as they move from the position shown in Fig. 2 to that shown in Fig. 5. 28 designates a bumper rail secured in front of the parallel bars 25 and 26 and held in place by bolts 29 connecting the bumper rail 28 with the plates 21.

The extension plate 8 previously referred to, and shown in Figs. 1 and 3, is fixedly carried by the upper equalizing bar 25 to which it is welded or otherwise attached in perpendicular relation as shown in Figs. 8 and 9, the extension plate 8 overlying and being in contact with the inclined upper edges 24 of the supporting bars 9 and with its rear edge in juxtarelation to the front edge of the forwardmost floor plate 7. With this arrangement it will be seen that as the extension plate 8 becomes inclined laterally by contact with an inclined floor or tail gate of a transport truck, the equalizing bars 25 and 26 assume correspondingly inclined positions and carry with them the several supporting channel bars on which the floor plates rest so that the floor plates, which are loosely supported on the supporting bars but interlocked therewith, assume positions warped and inclined to a horizontal plane as determined by the position of the extension plate 8, and the supporting channel bars thus assume differently elevated positions corresponding to the degree of warping and inclination of the floor plates laterally.

In order to elevate the ramp, there is provided a fluid-pressure elevating means comprising a cylinder 32, see Fig. 3, connected by pipe 33 with any suitable source of fluid-pressure supply while 34 designates a conventional valve control means for the fluid-pressure supply to elevate and permit lowering of a piston within the cylinder 32. The piston in cylinder 32 is connected by a universal joint 35 to a cap 36 that is fixedly mounted on a frame including two channel irons 37, see Figs. 1 and 11, which span the two central supporting bars 9, the frame carrying the cap 36 being loosely supported on the two central bars 9 by suitable connections 38 that permit the fluid-pressure means to elevate the ramp or permit lowering the same while allowing for the variable movements or positions of the channel supporting bars when at different elevations. The fluid-pressure cylinder 32 is mounted by means of a pivotal connection 39, see Fig. 3, in a base 41 that is anchored in the concrete bottom of a well 42 in which the fluid-pressure control means is located, the pivot 39 being parallel to the aforementioned fixed shaft 11 on which the supporting bars are pivotally mounted, thus permitting the necessary swinging movement of cylinder 32 as the supporting bars 9 are elevated or lowered.

The operation of the ramp briefly is as follows: Assuming the parts to be in the position illustrated in Fig. 3, the valve control is operated to elevate the ramp by moving the forward ends of the supporting bars 9 upwardly, during which movement their rear ends swing about the fixed shaft 11, and when they have reached a sufficiently high position so that the extension plate 8 will clear the floor of a transport truck, the transport truck is backed under the extension plate 8. When the transport truck is in loading position in relation to the loading dock, the fluid-pressure is released and the floor plates and supporting bars are permitted to lower until the front edge of extension plate 8 engages the floor of the transport truck or the tail gate thereof, whichever is in operative position. The extension plate 8 will then adjust itself to the floor of the truck and assume a position in close contact therewith throughout the width of the extension plate irrespective of the angle of inclination at which the truck floor may be positioned at the moment. As the extension plate 8 assumes a position inclined to a horizontal plane, the transverse equalizing bars 25 and 26 assume correspondingly inclined positions and the supporting channel bars which are connected therewith occupy positions at varying elevation, as illustrated in Fig. 5. Consequently the floor plates 7 and 6 assume corresponding warped and horizontally inclined positions while retaining their interlocked relation with the supporting bars, and the rearmost floor plate 7 retains a position in contact with the rear ends of the supporting bars and in substantial alinement with the adjacent surface of the loading dock so that a continuous and uninterrupted floor surface is maintained from loading dock into the transport vehicle or truck, the several floor plates being maintained at such relative inclination to a horizontal plane and so warped as to insure safe movement of a hand truck on to the floor of a transport vehicle without a break or drop from the front end of the extension plate onto the floor of the truck.

While the invention has been described with reference to certain details of construction as herein shown, it is not confined to the particular arrangement disclosed and this application is intended to cover such modifications or departures as may come within the purposes of the improvements or the scope of the following claims.

I claim:

1. A loading ramp comprising a fixed shaft, a plurality of spaced supporting bars pivoted at one end on said shaft and independently movable in spaced parallel vertical planes, a floor plate extending across and resting on said supporting bars, and connectors on said floor plate loosely engaging portions of said supporting bars and having limited movement relative thereto permitting the floor plate to occupy a position inclined in two directions to a horizontal plane and the supporting bars to occupy positions at correspondingly different elevations.

2. A loading ramp comprising a fixed shaft, a plurality of spaced supporting bars pivotally mounted at one end on said shaft and independently movable in spaced parallel vertical planes, a floor plate extending across and resting on said supporting bars, and connectors on said floor plate loosely engaging enlarged openings in said supporting bars and having limited movement relative thereto whereby the floor plate is permitted slight lateral movement relatively to the supporting bars and can occupy a position inclined in two directions to a horizontal plane and the supporting bars can occupy positions at correspondingly different elevations.

3. A loading ramp comprising a fixed shaft, a plurality of spaced supporting bars pivoted at one end on said shaft and independently movable in spaced parallel vertical planes, a floor plate extending across and resting on said supporting bars, and downwardly extending interlocking pins carried by the floor plate and engaging openings in the supporting bars, said openings being somewhat larger than the interlocking pins and permitting lateral movement of the floor plate relatively to the supporting bars when the latter occupy positions at different elevations and the floor plate is inclined in two directions to a horizontal plane.

4. A loading ramp comprising a fixed shaft, a plurality of spaced supporting bars pivoted at their rear ends on said shaft and independently movable in spaced parallel vertical planes, spaced transverse parallel bars connecting said supporting bars at their front ends, a plurality of floor plates extending across and resting on said supporting bars in juxtarelation to each other, and interlocking connections on each of said floor plates loosely engaging portions of the underlying supporting bars and having limited movement relative thereto permitting the floor plates to occupy positions inclined in two directions to a horizontal plane and the supporting bars to occupy positions at correspondingly different elevations.

5. A loading ramp comprising a fixed shaft, a plurality of spaced supporting bars pivoted at their rear ends on said shaft and independently movable in spaced parallel vertical planes, equalizing devices movably bolted to the supporting bars forwardly of said pivoted rear ends, a plurality of floor plates extending across and resting on said supporting bars in juxtarelation to each other, and interlocking connections on each of said floor plates loosely engaging portions of the underlying supporting bars permitting the floor plates to occupy positions inclined in two directions to a horizontal plane and the supporting bars to occupy positions at correspondingly different elevations.

6. A loading ramp comprising a fixed shaft, a plurality of spaced supporting bars pivotally mounted at their rear ends on said shaft and independently movable in spaced parallel vertical planes, a plurality of floor plates extending across and resting on said supporting bars in juxtarelation to each other, each of said floor plates having interlocking devices loosely engaging portions of the underlying supporting bars and having limited movement relative thereto permitting slight lateral movement of the floor plates in relation to the supporting bars when the latter are located in different elevations and the floor plates are inclined in two directions to a horizontal plane, a transverse equalizing bar movably bolted to the supporting bars at their front ends, and an extension plate carried by said transverse bar and located adjacent to and in downwardly inclined relation to the forwardmost floor plate.

7. A loading ramp comprising a fixed shaft, a plurality of spaced supporting bars pivoted at their rear ends on said shaft and independently movable in spaced parallel vertical planes, a plurality of floor plates extending across and resting on said supporting bars in juxtarelation to each other, each of said floor plates having downwardly extending interlocking pins fixedly carried thereby and engaging openings in the supporting bars, said openings being somewhat larger than the interlocking pins and permitting slight lateral movement of the floor plates relatively to the supporting bars when the latter occupy positions at different elevations and the floor plates are inclined in two directions to a horizontal plane, transversely arranged plates fixed to the supporting bars at their forward ends, transversely extending spaced parallel equalizing bars movably bolted to said transverse plates and connecting said supporting bars, and an extension plate fixedly attached to the upper of said equalizing bars and located adjacent to and inclined downwardly from the forwardmost floor plate.

8. A loading ramp comprising a fixed shaft, a plurality of spaced supporting bars pivoted at their rear ends on said shaft and independently movable in spaced parallel vertical planes, a plurality of floor plates extending across and resting on said supporting bars in juxtarelation to each other, spaced parallel angle bars rigidly attached to the underside of each floor plate between said supporting bars, each of said floor plates having fixed downwardly extending interlocking pins engaging openings in the supporting bars, said openings being somewhat larger than the interlocking pins and permitting slight lateral movement of the floor plates relatively to the supporting bars when the latter occupy positions at different elevations and the floor plates are inclined in two directions to a horizontal plane, an extension plate movably bolted to the supporting bars at their forward ends and located in juxtarelation and downwardly inclined to the forwardmost floor plate, and elevating means associated with the supporting bars.

9. A loading ramp comprising a fixed shaft, a plurality of supporting bars pivotally mounted at their rear ends on said shaft and independently movable in spaced vertical planes, a plurality of floor plates extending across and resting on said supporting bars in juxtarelation to each other, said floor plates having downwardly extending interlocking pins carried thereby engaging openings in the supporting bars, said openings being somewhat larger than the interlocking pins permitting slight lateral movement of the floor plates relatively to the supporting bars when the latter occupy positions at different elevations and the floor plates are inclined in two directions to a horizontal plane, an equalizer bar movably bolted to the forward ends of the supporting bars, and an extension plate carried by said equalizer bar and located in juxtarelation and downwardly inclined to the forwardmost floor plate.

ARTHUR S. HAMILTON, Jr.

REFERENCES CITED

The following references are of record in the file of this patent:

UNITED STATES PATENTS

| Number | Name | Date |
|---|---|---|
| 408,805 | Kent et al. | Aug. 13, 1889 |
| 807,231 | Alsop | Dec. 12, 1905 |
| 1,112,543 | Love | Oct. 6, 1914 |